Patented Nov. 9, 1937

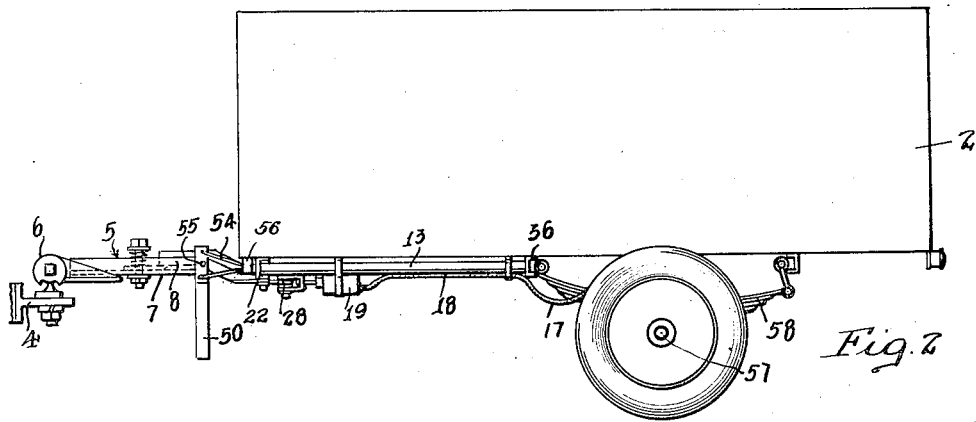

2,098,458

UNITED STATES PATENT OFFICE 2,098,458

TRAILER BRAKE APPARATUS

Fred J. Machovec, Monterey, Calif.

Application September 18, 1936, Serial No. 101,457

7 Claims. (Cl. 188—142)

This invention relates to brake apparatus for trailers, and the invention is particularly applicable to trailers such as are now in common use and which are towed by automobiles.

One of the objects of the invention is to provide simple means for automatically applying the brakes of the trailer when the brakes of the towing car are applied.

One of the objections to trailer brake apparatus is that where the apparatus operates so that the brakes are applied automatically by relative forward movement of the trailer with respect to the towing car, it is impossible to back the trailer with the towing car because this will automatically apply the brakes. For this reason in many of the present types of brake apparatus for this purpose it is necessary to disconnect parts, or else make some change in them that will prevent the operation of the brakes.

One of the objects of this invention is to provide simple means for enabling the brake apparatus to be held off automatically except when the brake of the towing car is applied, thereby enabling the towing car to back the trailer without applying the brakes of the trailer.

A further object of the invention is to provide a construction which will automatically apply the brakes of the trailer in case the trailer becomes disconnected from the towing car while traveling on the road.

Further objects of the invention will appear hereinafter.

The invention consists in the novel parts and combinations of parts to be described hereinafter, all of which contribute to produce an efficient trailer brake apparatus.

A preferred embodiment of the invention is described in the following specification, while the broad scope of the invention is pointed out in the appended claims.

In the drawing:

Fig. 1 is a side elevation upon reduced scale with certain parts broken away and illustrating the general arrangement of the apparatus.

Fig. 2 is a side elevation of the trailer upon an enlarged scale and further illustrating the apparatus. In this view the draw-bar of the towing car is illustrated broken away.

Fig. 3 is a plan of the apparatus illustrated in Fig. 2 with the body of the trailer removed and with certain parts broken away.

Fig. 4 is a vertical section about on the line 4—4 of Fig. 3 upon an enlarged scale, with certain parts broken away, and further illustrating details of the construction including a sliding connection which enables the brakes to be applied automatically when the trailer tends to run up, or run forward toward the towing car, when the brakes of the towing car are applied.

Fig. 5 is a vertical cross section taken on the line 5—5 of Fig. 4, and further illustrating details of the means for automatically applying the brakes of the trailer in case its connection to the towing car becomes accidentally broken. In this view certain parts are broken away.

Fig. 6 is a longitudinal section taken on the line 6—6 through a control valve carried by the towing car, and through the medium of which the driver of the towing car can control the application of the trailer brakes.

Referring more particularly to the parts, and especially Figure 1, 1 and 2 represent the towing car and the trailer. In the present instance the towing car is supposed to be driven by means of an internal combustion engine having an intake 3 to which the combustible fuel, or combustible mixture, passes into the engine cylinders.

The rear end of the towing car 1 is provided with a draw-bar 4 to which a sliding connection 5 is attached, said sliding connection preferably including a draw head 6 that is attached to the draw-bar 4, and this draw head 6 is rigidly secured to a member 7 preferably in the form of a channel bar with the side flanges 8 of the bar extending up.

The horizontal web of the channel bar is preferably provided with a slot 9 in which a bolt 10 slides, said bolt being utilized for securing a slide member 11 in the channel. The bolt 10 is preferably a long bolt and provided with a heavy spring 12 that presses down on the slide 11 and holds it at the bottom of the channel but so as to permit sliding movement of the slide in a front and rear direction. In this movement the slide is preferably guided by the flanges 8 of the channel bar 7. The rear end of the slide 11 is secured, as by welding or otherwise, to a tongue 13, said tongue being preferably offset upwardly at its forward end to form a shank 14 that lies on the upper face of the slide 11 at the point where the welding connection is made. The upward offset of the shank 14 is necessary to bring the rear end of the tongue up to the elevation of the draw-bar 4. The rear end of the channel 7 is offset downwardly so as to bring its rear portion underneath the body of the tongue 13.

If desired, anti-friction balls 11a or rollers may be provided under the slide 11, (see Fig. 4).

The trailer 2 is provided with wheels 15 having hydraulic brakes (not illustrated) at the points 16 and supplied with operating fluid through branch pipes 17 branching off from the main pipe 18, which is connected at its forward end with a master cylinder 19.

The construction I employ operates in such a way that when a relative forward movement of the slide 11 and tongue 13 takes place, the operating fluid in the master cylinder will be forced into the pipes 18 and 17 and apply the brakes. Any suitable construction may be employed for this purpose, but in the present instance I attach a slide 20 to the rear end of the channel 7 and this slide is supported and slides freely through a guide bracket 21 attached to the under side of a transverse frame bar 22 of the trailer structure to which the tongue 13 is rigidly attached, for example, by welding. The rear end of the slide 20 is connected by a bracket 23 and a vertical bolt 24 to the piston rod 25 that extends forwardly from the master cylinder 19, said master cylinder being secured under the tongue 13 and rigid with the tongue. It may be welded to the tongue or secured in any other suitable way and may include one or more metal straps, such as the metal strap 26 illustrated in Fig. 4 for increasing the security of this connection.

With this construction it will be evident that if a relative rearward movement of the channel 7 takes place, relative to the trailer, the piston rod 25 of the master cylinder will move toward the rear. The piston 27 of the master cylinder is normally disposed in a forward position in the master cylinder and hence when this movement takes place, the operating fluid in the rear portion of the master cylinder will be forced out under pressure through the pipe 18 and apply the brakes.

In accordance with my invention, I also provide means for normally preventing the trailer from moving forward relatively to the towing car, which movement would otherwise apply the brakes. For this purpose I prefer to provide a lever 28 pivotally mounted at 29 to swing in a horizontal plane on a bracket 30 attached to the frame bar 22. One end of this lever 28 is attached by a pin-and-slot connection to the bolt 24, and the other end of the lever is attached to the piston rod 31 of a pneumatic cylinder 32. The rear end of the pneumatic cylinder 32 is pivotally connected by a pin 33 to a supporting rod 34 that extends rearwardly and is pivotally connected by a bolt 35 to a frame bar 36 of the trailer frame. The piston 37 of the pneumatic cylinder 32 is normally located adjacent the rear end of the cylinder 32. In this connection it should be noted that the axis of the pneumatic cylinder 32 is parallel with the axis of the master cylinder 19, and the axes of these cylinders extend in a front and rear direction under the trailer.

It will be evident from an inspection of Figure 3 that if the trailer "ran-up" or shifted forwardly on the towing car, the inner end of the lever 28 would be swung rearward, and the other end of the lever would swing forwardly and move the pneumatic piston 37 forwardly. The forward end of the cylinder 32 is open to the atmosphere at 32a.

A connection is provided to the towing car enabling a partial vacuum to be normally maintained in the pneumatic cylinder 32 to the rear of the piston 37 so as to hold this lever 28 fixed, and prevent the trailer "running-up" on the towing car, and thereby applying the brakes. For this purpose I provide a pneumatic hose or pipe 38 that extends from the rear head of the pneumatic cylinder 32 forwardly to a control valve 39a (see Fig. 1) located in a position for automatic operation by the driver of the towing car when he puts on the brakes of the towing car. This valve 39a is preferably in the form of a slide valve as illustrated in Fig. 6. From the casing 40 of this valve a pneumatic hose 41 extends upwardly and is attached to the intake 3 of the engine. The valve proper is in the form of a piston 42 that has a waist of reduced diameter forming a passage 43 which may connect the hose 41 with the pipe or hose 38. Fig. 6 shows the valve in this position, and this is the position which the valve would normally have when the towing car is towing the trailer. The piston 42 of this valve may be pivotally connected to an operating link 44 that is pivotally connected at its upper end to the brake lever 45 pivoted at 46, and provided with a return spring 47. The piston valve 42 is provided with means for connecting the pipe 38 to atmosphere when the brake of the towing car is applied. This will release piston 37 and permit the trailer to "run up" on the car and apply the trailer brakes. For this purpose I provide a port 42a in the side of the piston 42 that runs in from its end, and when the brake lever 45 has been depressed the end of this passage or port 42a will connect up with the end of hose 38. The pneumatic piston 37 can then move freely in the pneumatic cylinder 3.

The trailer is provided with automatic means for applying its brakes if the connection to the towing car becomes broken accidentally on the road, and for this purpose I prefer to provide a bifurcated lever 50, the arms 51 of which extend upwardly and lie against the outer sides of the flanges 8 of the channel bar 7 to which they are attached by studs 52. The lower end of this lever 50 is located at a sufficient distance above the road line 53 to prevent its being accidentally operated when the towing car and trailer are moving along on an uneven roadway. One or both of the arms 51 of the lever 50 are provided with two flexible connections 54, preferably consisting of short cables. Two of these cables 54 are attached to the arms 51 above the pivot stud 52 and the other cables are attached below the pivot stud, and the rear ends of these flexible connections or cables 54 are attached by a bolt 55 to the tongue 13. Preferably this bolt 55 also attaches the tongue 13 to a suspending bracket 56 attached to the under side of the trailer body (see Fig. 4).

With this construction it will be evident that if the sliding connection 5 or the connection at the draw head 6 becomes broken, the forward end of the trailer will descend and strike the roadway, and this will cause the lower end of the lever 50 to be moved toward the rear. This will develop tension in the upper cables 54 and cause the channel bar 7 to move toward the rear. This will actuate the piston of the master cylinder 19 and apply the hydraulic brakes.

It will also be evident that if the towing connection becomes broken while the trailer is moving rearwardly, the brakes will be applied in the same way. This is evident because if the lower end of the lever 50 strikes the roadway, it will be swung forwardly. This will develop tension in the lower cables 54 and this will cause a rearward movement of the channel bar 7 and apply the brakes in the same way.

The trailer wheels 15 may be mounted on the usual rear axle 57 and springs 58.

The general mode of operation of the brake apparatus will now be briefly described: Normally the trailer brakes cannot be applied because the pneumatic cylinder 32 will not permit a relative forward movement of the trailer with respect to the towing car. When the brake lever 45 of the towing car is depressed to apply the brake of the towing car, it will move the valve 42 forward thereby breaking the partial vacuum at the back of pneumatic cylinder 32. When this occurs the master cylinder 19, rigid with the trailer body, moves relatively forward on the piston rod 25 (see Fig. 4), thereby developing pressure in the rear end of the master cylinder and applying the hydraulic brakes of the trailer through the medium of the connecting pipes 18 and 17.

It will be evident that the trailer can be backed by the towing car. So long as the motor of the towing car is running, the partial vacuum will be maintained in the pneumatic cylinder, and the trailer brakes will not apply themselves until the brake of the towing car is applied.

It is understood that the embodiment of the invention described herein is only one of the many embodiments this invention may take, and I do not wish to be limited in the practice of the invention, nor in the claims, to the particular embodiment set forth.

What I claim is:

1. In a trailer brake apparatus, to be used with a towing car having an internal combustion engine with an air intake the combination of a member constructed to be attached to the towing car, a member attached to the trailer, said members capable of relative sliding movement in the front and rear direction, means for applying the trailer brakes when the trailer moves forwardly with respect to the first named member, and means capable of being controlled by the driver of the towing car, including a pneumatic cylinder connected to the engine intake for normally preventing the trailer from relative forward movement with respect to the towing car.

2. In a trailer brake apparatus to co-operate with a towing car having an internal combustion engine with an intake, the combination of a member constructed to be attached to the towing car, a second member attached to the trailer, said members capable of relatively sliding movement in a front and rear direction, means actuated by a relative forward movement of the second named member for applying the trailer brakes, a pneumatic cylinder carried by the trailer connected with the brake actuating mechanism, means for normally maintaining communication between the pneumatic cylinder and the intake of the engine to prevent application of the brakes, and means for breaking the partial vacuum in the pneumatic cylinder actuated when the brake of the towing car is applied.

3. In a brake apparatus for trailers, the combination of a member having means for attaching the same to the rear end of the towing car, said member consisting of a channel bar with upwardly projecting side flanges, a second member including a slide resting on the channel bar, engaging the said flanges so as to be guided thereby and connected with the channel bar so as to permit relative movement of the slide in a front and rear direction, a tongue connected with the slide extending rearwardly under the trailer and rigidly secured to the same, hydraulic brake apparatus for the trailer with means for actuating the same when a relative forward movement of the slide occurs with respect to the channel bar, and means actuated by the driver of the car for controlling the application of the brakes of the trailer.

4. In a brake apparatus for trailers, the combination of a member having means for attaching the same to the rear end of the towing car, said member consisting of a channel bar with upwardly projecting side flanges, a second member including a slide resting on the channel bar between the said flanges and connected with the channel bar so as to permit relative movement of the slide in a front and rear direction, a tongue connected with the slide extending rearwardly under the trailer and rigidly secured to the same, hydraulic brake apparatus for the trailer with means for actuating the same when a relative forward movement of the slide occurs with respect to the channel bar, and automatic means for applying the trailer brakes if the connection between the towing car and the trailer becomes disengaged.

5. In a brake apparatus for trailers, the combination of a member having means for attaching the same to the rear end of the towing car, said member consisting of a channel bar with upwardly projecting side flanges, a second member including a slide resting on the channel bar between the said flanges and connected with the channel bar so as to permit relative movement of the slide in a front and rear direction, a tongue connected with the slide extending rearwardly under the trailer and rigidly secured to the same, hydraulic brake apparatus for the trailer with means for actuating the same when a relative forward movement of the slide occurs with respect to the channel bar, means capable of being operated by the driver of the car for inhibiting the brake apparatus to prevent the application of the brakes when the towing car is backing the trailer, a lever pivotally mounted on the channel bar to swing in a front and rear direction and extending downwardly from the same, said lever operating to strike the ground if the connection between the towing car and the trailer is broken, and means connecting the lever with the tongue and operating to develop a relative movement between the channel bar and the slide to apply the trailer brakes automatically when the connection to the towing car is broken.

6. In a trailer brake apparatus to cooperate with a towing car having an internal combustion engine with an intake, the combination of a hydraulic master cylinder carried by the trailer, a piston for the same connected with the towing car so that when the brake on the towing car is applied and the trailer moves forwardly relative to the towing car, pressure will be developed in the master cylinder to apply the hydraulic brakes of the trailer, a pneumatic cylinder carried by the trailer with means connecting the same with the piston of the master cylinder and capable of preventing relative forward movement of the trailer with respect to the towing car, and a pneumatic hose connected with the intake of the towing car, with means for controlling the same by the driver of the towing car.

7. Trailer brake apparatus constructed in accordance with claim 6 in which the pneumatic cylinder is mounted with its axis extending in a front and rear direction, and the means for connecting the master cylinder with the piston of the pneumatic cylinder includes a lever pivotally supported on the trailer at an intermediate point on its length, with means for connecting the same at one end to the piston of the master cylinder, and means for connecting the same toward the other end with the pneumatic cylinder.

FRED J. MACHOVEC.